United States Patent
Lee et al.

(10) Patent No.: US 6,922,472 B2
(45) Date of Patent: *Jul. 26, 2005

(54) METHOD AND SYSTEM FOR PERFORMING PERMUTATIONS USING PERMUTATION INSTRUCTIONS BASED ON BUTTERFLY NETWORKS

(75) Inventors: Ruby B. Lee, Princeton, NJ (US); Xiao Yang, Princeton, NJ (US); Manish Vachharajani, Hamilton, NJ (US)

(73) Assignee: Teleputers, LLC, Princeton, NJ (US)

( * ) Notice: Subject to any disclaimer, the term of this patent is extended or adjusted under 35 U.S.C. 154(b) by 820 days.

This patent is subject to a terminal disclaimer.

(21) Appl. No.: 09/850,237

(22) Filed: May 7, 2001

(65) Prior Publication Data

US 2002/0031220 A1 Mar. 14, 2002

Related U.S. Application Data

(60) Provisional application No. 60/202,245, filed on May 5, 2000.

(51) Int. Cl.[7] ............................. H04K 1/04; H04K 1/06; H04K 1/00; H04K 3/00
(52) U.S. Cl. ............................. 380/37; 380/28; 380/1
(58) Field of Search ............................. 380/37, 28, 1

(56) References Cited

U.S. PATENT DOCUMENTS

| | | |
|---|---|---|
| 3,796,830 A | 3/1974 | Smith |
| 3,962,539 A | 6/1976 | Ehrsam et al. |
| 4,275,265 A | 6/1981 | Davida et al. |
| 4,972,481 A | 11/1990 | Santesson |
| 5,001,753 A | 3/1991 | Davio et al. |
| 5,483,541 A | 1/1996 | Linsky |
| 5,495,476 A * | 2/1996 | Kumar ........................ 370/388 |
| 5,546,393 A * | 8/1996 | Minc ........................ 370/230.1 |
| 5,673,321 A | 9/1997 | Lee |
| 5,768,493 A | 6/1998 | Kumar |
| 5,956,405 A | 9/1999 | Yuval |
| 6,081,896 A | 6/2000 | Johns-Vano et al. |
| 6,119,224 A | 9/2000 | Roth |
| 6,195,026 B1 | 2/2001 | Acharya |
| 6,275,587 B1 | 8/2001 | Amerige |
| 6,381,690 B1 * | 4/2002 | Lee ........................ 712/223 |
| 6,446,198 B1 * | 9/2002 | Sazegari ........................ 712/300 |
| 6,629,115 B1 * | 9/2003 | Rossignol ........................ 708/209 |

OTHER PUBLICATIONS

Advanced Encryption Standard, "Announcing Request for Candidate Algorithm Nominations for the Advanced Encryption Standard (AES)," http://csrc.nist.gov/encryption/aes/pre-round1/aes_9709.htm.

* cited by examiner

Primary Examiner—Gilberto Barrón, Jr.
Assistant Examiner—Grigory Gurshman
(74) Attorney, Agent, or Firm—Mathews, Shepherd, McKay & Bruneau, P.A.

(57) ABSTRACT

The present invention provides permutation instructions which can be used in software executed in a programmable processor for solving permutation problems in cryptography, multimedia and other applications. The permute instructions are based on a Benes network comprising two butterfly networks of the same size connected back-to-back. Intermediate sequences of bits are defined that an initial sequence of bits from a source register are transformed into. Each intermediate sequence of bits is used as input to a subsequent permutation instruction. Permutation instructions are determined for permitting the initial source sequence of bits into one or more intermediate sequence of bits until a desired sequence is obtained. The intermediate sequences of bits are determined by configuration bits. The permutation instructions form a permutation instruction sequence of at least one instruction. At most 21 gr/m permutation instructions are used in the permutation instruction sequence, where r is the number of k-bit subwords to be permuted, and m is the number of network stages executed in one instruction. The permutation instructions can be used to permute k-bit subwords packed into an n-bit word, where k can be 1, 2, . . . , or n bits, and k*r=n.

65 Claims, 12 Drawing Sheets

70 — Divide the bits of each register into two groups each going to separate destination registers using two CROSS instruction sequences 71 — Put the two groups of bits of each register into the respective destination register 72 — Perform CROSS instruction sequences to perform permutations on bits in each destination register

100

110

METHOD AND SYSTEM FOR PERFORMING PERMUTATIONS USING PERMUTATION INSTRUCTIONS BASED ON BUTTERFLY NETWORKS

This application claims the benefit of provisional application No. 60/202,245, filed May 5, 2000.

BACKGROUND OF THE INVENTION

1. Field of the Invention

The present invention relates to a method and system for performing arbitrary permutations of a sequence of bits in a programmable processor by determining a permutation instruction based on butterfly networks.

2. Description of the Related Art

The need for secure information processing has increased with the increasing use of the public internet and wireless communications in e-commerce, e-business and personal use. Typical use of the internet is not secure. Secure information processing typically includes authentication of users and host machines, confidentiality of messages sent over public networks, and assurances that messages, programs and data have not been maliciously changed. Conventional solutions have provided security functions by using different security protocols employing different cryptographic algorithms, such as public key, symmetric key and hash algorithms.

For encrypting large amounts of data, symmetric key cryptography algorithms have been used, see Bruce Schneier, "Applied Cryptography", 2nd Ed., John Wiley & Sons, Inc.,1996. These algorithms use the same secret key to encrypt and decrypt a given message, and encryption and decryption have the same computational complexity. In symmetric key algorithms, the cryptographic techniques of "confusion" and "diffusion" are synergistically employed. "Confusion" obscures the relationship between the plaintext (original message) and the ciphertext (encrypted message), for example, through substitution of arbitrary bits for bits in the plaintext. "Diffusion" spreads the redundancy of the plaintext over the ciphertext, for example through permutation of the bits of the plaintext block. Such bit-level permutations have the drawback of being slow when implemented with conventional instructions available in microprocessors and other programmable processors.

Bit-level permutations are particularly difficult for processors, and have been avoided in the design of new cryptography algorithms, where it is desired to have fast software implementations, for example in the Advanced Encryption Standard, as described in NIST, "Announcing Request for Candidate Algorithm Nominations for the Advanced Encryption Standard (AES)", http://csrc.nist.gov/encryption/aes/pre-round1/aes_9709.htm, Since conventional microprocessors are word-oriented, performing bit-level permutations is difficult and tedious. Every bit has to be extracted from the source register, moved to its new location in the destination register, and combined with the bits that have already been moved. This requires 4 instructions per bit (mask generation, AND, SHIFT, OR), and 4n instructions to perform an arbitrary permutation of n bits. Conventional microprocessors, for example Precision Architecture (PA-RISC) have been described to provide more powerful bit-manipulation capabilities using EXTRACT and DEPOSIT instructions, which can essentially perform the four operations required for each bit in 2 instructions (EXTRACT, DEPOSIT), resulting in 2n instructions for any arbitrary permutation of n bits, see Ruby Lee, "Precision Architecture", *IEEE Computer*, Vol. 22, No. 1, pp. 78–91, January 1989. Accordingly, an arbitrary 64-bit permutation could take 128 or 256 instructions on this type of conventional microprocessor. Pre-defined permutations with some regular patterns have been implemented in fewer instructions, for example, the permutations in DES, as described in Bruce Schneier, "Applied Cryptography", 2nd Ed., John Wiley & Sons, Inc.,1996.

Conventional techniques have also used table lookup methods to implement fixed permutations. To achieve a fixed permutation of n input bits with one table lookup, a table with $2^n$ entries is used with each entry being n bits. For a 64-bit permutation, this type of table lookup would use $2^{67}$ bytes, which is clearly infeasible. Alternatively, the table can be broken up into smaller tables, and several table lookup operations could be used. For example, a 64-bit permutation could be implemented by permuting 8 consecutive bits at a time, then combining these 8 intermediate permutations into a final permutation. This method requires 8 tables, each with 256 entries, each entry being 64 bits. Each entry has zeros in all positions, except the 8 bit positions to which the selected 8 bits in the source are permuted. After the eight table lookups done by 8 LOAD instructions, the results are combined with 7 OR instructions to get the final permutation. In addition, 8 instructions are needed to extract the index for the LOAD instruction, for a total of 23 instructions. The memory requirement is 8*256*8=16 kilobytes for eight tables. Although 23 instructions is less than the 128 or 256 instructions used in the previous method, the actual execution time can be much longer due to cache miss penalties or memory access latencies. For example, if half of the 8 Load instructions miss in the cache, and each cache miss takes 50 cycles to fetch the missing cache line from main memory, the actual execution time is more than 4*50=200 cycles. Accordingly, this method can be longer than the previously described 128 cycles using EXTRACT and DEPOSIT. This method also has the drawback of a memory requirement of 16 kilobytes for the tables.

Permutations are a requirement for fast processing of digital multimedia information, using subword-parallel instructions, more commonly known as multimedia instructions, as described in Ruby Lee, "Accelerating Multimedia with Enhanced Micro-processors", *IEEE Micro*, Vol. 15, No. 2, pp.22–32, April 1995, and Ruby Lee, "Subword Parallelism in MAX-2", *IEEE Micro*, Vol. 16, No. 4, pp.51–59, August 1996. Microprocessor Instruction Set Architecture (ISA) uses these subword parallel instructions for fast multimedia information processing. With subwords packed into 64-bit words, it is often necessary to rearrange the subwords within the word. However, such subword permutation instructions are not provided by many of the conventional multimedia ISA extensions.

A few microprocessor architectures have subword rearrangement instructions. MIX and PERMUTE instructions have been implemented in the MAX-2 extension to Precision Architecture RISC (PA-RISC) processor, see Ruby Lee, "Subword Parallelism in MAX-2", *IEEE Micro*, Vol. 16, No. 4, pp.51–59, August 1996. The MAX-2 general-purpose PERMUTE instruction can do any permutation, with and without repetitions, of the subwords packed in a register. However, it is only defined for 16-bit subwords. MIX and MUX instructions have been implemented in the IA-64 architectures, which are extensions to the MIX and PERMUTE instructions of MAX-2, see Intel Corporation, "IA-64 Application Developers' Architecture Guide", *Intel Corporation*, May 1999. The IA-64 uses MUX instruction, which is a fully general permute instruction for 16-bit subwords, with five new permute byte variants. A VPERM instruction has been used in an AltiVec extension to the Power PC™ available from IBM Corporation, Armonk, N.Y., see Motorola Corporation, "'AltiVec Extensions to PowerPC' Instruction Set Architecture Specification", *Motorola Corporation*, May 1998. The Altivec VPERM instruction extends the general permutation capabilities of MAX-2's PERMUTE instruction to 8-bit subwords selected from two 128-bit source registers, into a single 128-bit destination register. Since there are 32 such subwords from which 16 are selected, this requires 16*1g32=80 bits for specifying the desired permutation. This means that VPERM has to use another 128-bit register to hold the permutation control bits, making it a very expensive instruction with three source registers and one destination register, all 128 bits wide.

It is desirable to provide significantly faster and more economical ways to perform arbitrary permutations of n bits, without any need for table storage, which can be used for encrypting large amounts of data for confidentiality or privacy.

SUMMARY OF THE INVENTION

The present invention provides permutation instructions which can be used in software executed in a programmable processor for solving permutation problems in both cryptography and multimedia. For fast cryptography, bit-level permutations are used, whereas for multimedia, permutations on subwords of typically 8 bits or 16 bits are used. Permutation instructions of the present invention can be used to provide any arbitrary permutation of sixty-four 1-bit subwords in a 64-bit processor, i.e., a processor with 64-bit words, registers and datapaths, for use in fast cryptography. The permutation instructions of the present invention can also be used for permuting subwords greater than 1 bit in size, for use in fast multimedia processing. For example, in addition to being able to permute sixty-four 1-bit subwords in a register, the permutation instructions and underlying functional unit can permute thirty-two 2-bit subwords, sixteen 4-bit subwords, eight 8-bit subwords, four 16-bit subwords, or two 32-bit subwords. The permutation instructions of the present invention can be added as new instructions to the Instruction Set Architecture of a conventional microprocessor, or they can be used in the design of new processors or coprocessors to be efficient for both cryptography and multimedia software.

The method for performing permutations is by constructing a Benes interconnection network. This is done by executing a certain number of stages of the Benes network with permute instructions. The permute instructions are performed by a circuit comprising Benes network stages. Intermediate sequences of bits are defined that an initial sequence of bits from a source register are transformed into. Each intermediate sequence of bits is used as input to a subsequent permutation instruction. Permutation instructions are determined for permuting the initial source sequence of bits into one or more intermediate sequence of bits until a desired sequence is obtained. The intermediate sequences of bits are determined by configuration bits. The permutation instructions form a permutation instruction sequence. At most 1gn permutation instructions are used in the permutation instruction sequence.

In an embodiment of the present invention, multibit subwords are permuted by eliminating pass-throughs in the Benes network. In a further embodiment of the invention, the method and system are scaled for performing permutations of 2n bits in which subwords are packed into two or more registers. In this embodiment, at most 41gn+2 instructions are used to permute 2n bits using n-bit words.

For a better understanding of the present invention, reference may be made to the accompanying drawings.

DETAILED DESCRIPTION

Figure 1:
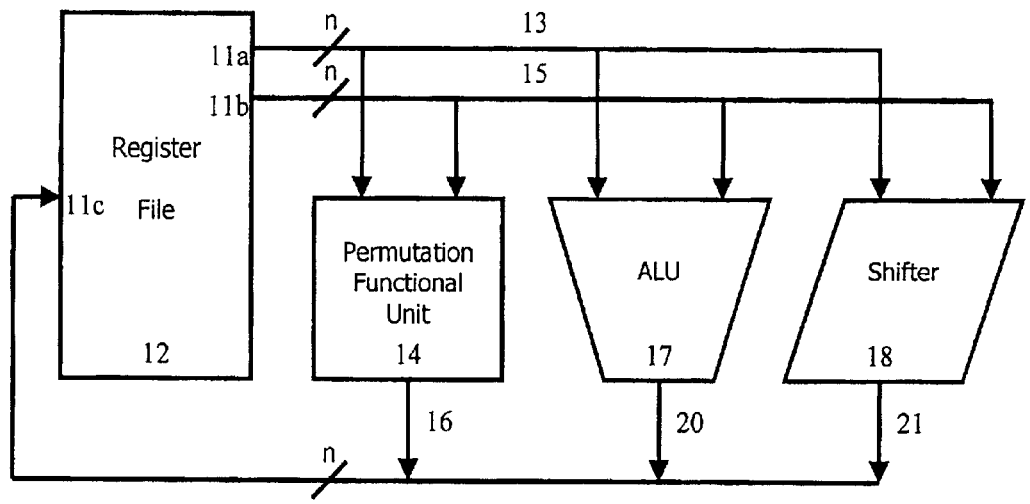
FIG. 1 is a schematic diagram of a system for implementing permutation instructions in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates a schematic diagram of a system for implementing efficient permutation instructions 10 in accordance with the teachings of the present invention. Register file 12 includes source register 11a, source register 11b and destination register 11c. System 10 can provide bit-level permutations of all n bits of any register in register file 12. The same solution can be applied to different subword sizes of $2^i$ bits, for i=0, 1, 2, ..., m, where $n=2^m$ bits. For a fixed word size of n bits, and 1-bit subwords, there are n subwords to be permuted. Source register values to be permuted 13 from source register 11a and configuration bits 15 from source register 11b are applied over datapaths to permutation functional unit 14. Source register values to be permuted 13 can be a sequence of bits or a sequence of subwords. Permutation functional unit 14 generates permutation result 16. Permutation result 16 can be an intermediate result if additional permutations are performed by permutation functional unit 14. For other instructions, arithmetic logic unit (ALU) 17 and shifter 18 receive source register values 13 from source register 11a and source register values 15 from source register 11b and generate a respective ALU result 20 and a shifter result 21 over a data path to destination register 11c. System 10 can be implemented in any programmable processor, for example, a conventional microprocessor, digital signal processor (DSP), cryptographic processor, multimedia processor and can be used in developing processors or coprocessors for providing cryptography and multimedia operations.

Figure 2:
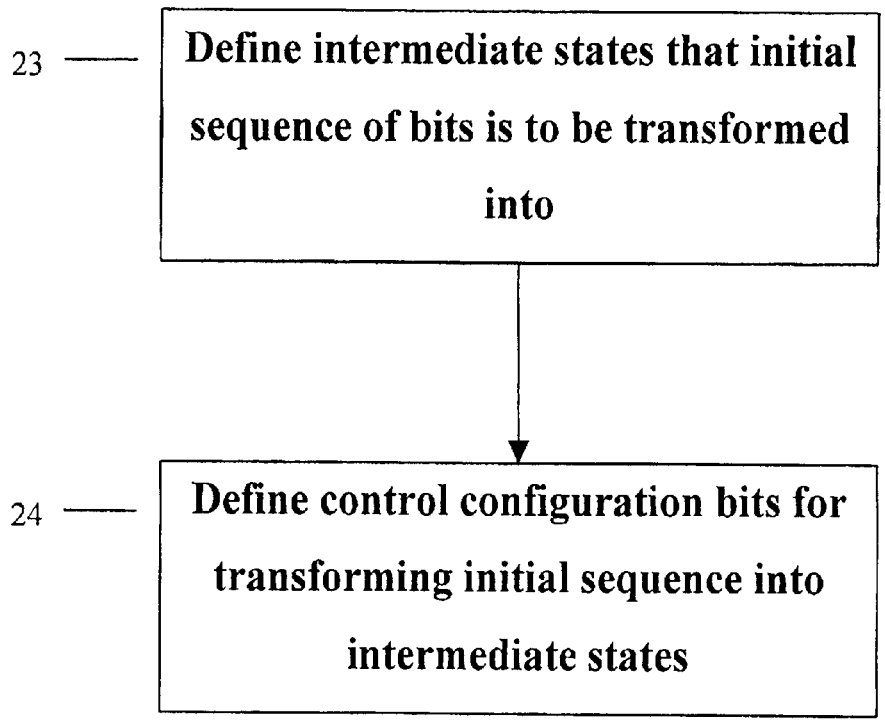
FIG. 2 is a flow diagram of a method for determining permutation instruction sequence to achieve a desired permutation in accordance with an embodiment of the present invention.

FIG. 2 is a flow diagram of a method of determining permutation instruction sequences for permutations 22. The determined permutation instruction sequences can be performed in permutation functional unit 14. In block 23, intermediate states are defined that an initial sequence of bits from a source register are to be transformed into. The final state is the desired permutation of the initial sequence of bits. In block 24, control configuration bits are defined for transforming the initial sequence into the first intermediate state and subsequent intermediate states until transformation into the final state.

Figure 3A:
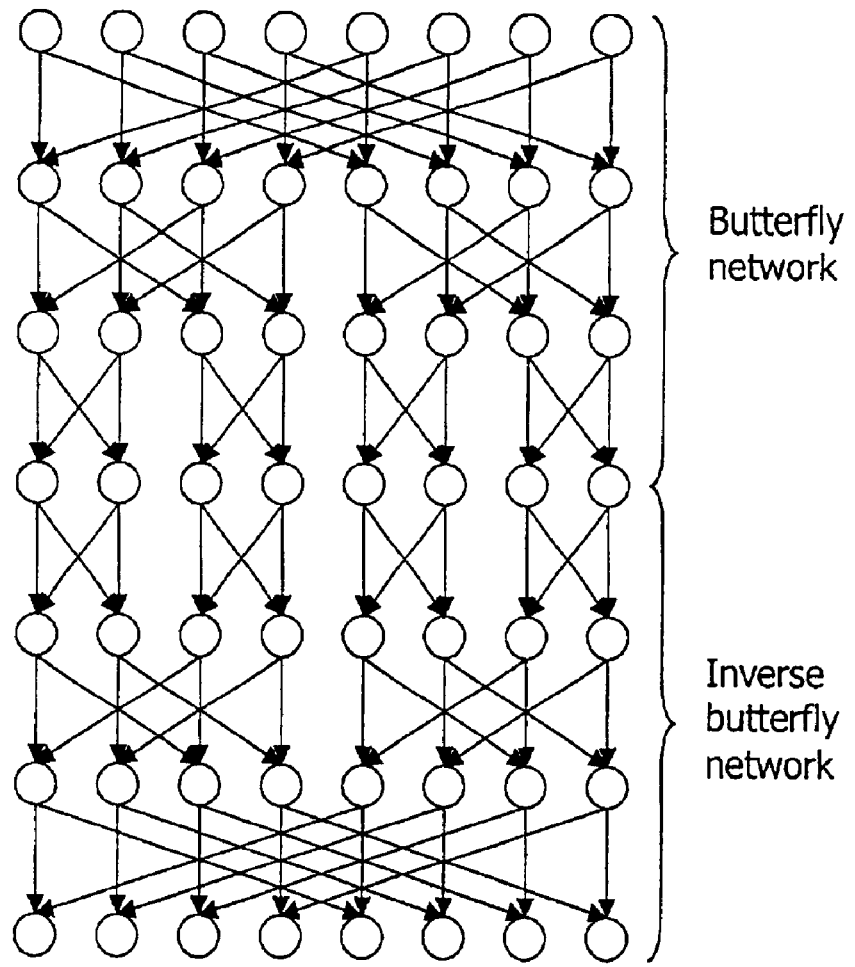
FIG. 3A is a schematic diagram of an 8-input Benes network.

A Benes network can be used to perform permutations of n bits with edge-disjoint paths using intermediate states. The Benes network can be formed by connecting two butterfly networks of the same size back-to-back. An example of an 8-input Benes network is shown in FIG. 3A.

An n-input Benes network can be broken into 2lgn stages, lgn of them are distinct. The number of node in each stage is n. A node is defined as a point in the network where the path selection for an input takes place. In each stage of a butterfly network, for every input, there is another input that shares the same two outputs with it. Such pairs of inputs can be referred to as "conflict inputs" and their corresponding outputs can be referred to as "conflict outputs". The distances between conflict pairs in one stage of the Benes network are the same. The distances between conflict pairs are different in different stages.

In the implementation of method 22 in a Benes network, basic operations are defined corresponding to one stage of the butterfly network. One basic operation is that done by one stage of a butterfly network. A basic operation is specified by a parameter m, where $2^m$ is the distance between conflict pairs for the corresponding stage. A basic operation uses n/2 configuration bits to set up the connections in the corresponding stage and move the n input bits to the output. Accordingly, for permuting the contents in an n-bit register, the n configuration bits for two basic operations can be packed into one configuration register for allowing two basic operations to be packed into a single instruction. Since an n-input Benes network has 1gn distinct stages, there are 1gn different basic operations. Bits from the source register are moved to the result register based on the configuration bits. In an embodiment of the present invention, if the configuration bit for a pair of conflict inputs is 0, the bits from the two conflict inputs go through non-crossing paths to the outputs. If the configuration bit for a pair of conflict inputs is 1, the bits from the two conflict inputs go through crossing paths to the outputs.

In a preferred embodiment of the invention, the instruction format for the permutation instruction can be defined as:

CROSS,m1,m2 R1,R2,R3 wherein m1 and m2 are the parameters that specify the two basic operations to be used, R1 is a reference to a source register which contains the subwords to be permuted, R2 is a reference to a configuration register that holds the configuration bits for the two basic operations and R3 is a reference to a destination register where the permuted subwords are placed. R1, R2 and R3 refer to any registers $R_i$, $R_j$ and $R_k$ where i, j and k can be all different or two or more of i, j and k can be the same. Alternately, $R_3$ can be omitted and the permuted subwords are placed in register $R_i$. A CROSS instruction performs two basic operations on the source according to the contents of the configuration register and the values of m1 and m2. The first basic operation can be determined by the value of m1. The first basic operation moves the bits in source register R1 based on the left half of the configuration bits held in the configuration in register R2 to an intermediate result. The second basic operation can be determined by the value of m2. The second basic operation moves the bits in the intermediate result according to the right half of the configuration bits in the register R2 to the destination register R3. Pseudo code for the CROSS instruction is shown in Table 1.

TABLE 1

| CROSS,m1,m2 R1, R2, R3 | R3 | = R1; |
|---|---|---|
| | j | = 0; |
| | dist | = 1 << m1; |
| | for | (s = 0; s < n; s += (dist * 2)) |
| | | for (i = 0; i < dist; i++) |
| | | if (R2[j++] == 1) |
| | | swap (R3[s+j], |
| | | R3[s+j+dist]); |
| | dist | = 1 << m1; |
| | for | (s = 0; s < n; s += (dist * 2)) |
| | | for (i = 0; i < dist; i++) |
| | | if (R2[j++] == 1) |
| | | swap (R3[s+j], |
| | | R3[s+j+dist]); |

The CROSS instruction can be added to the Instruction Set Architecture of conventional microprocessors, digital signal processor (DSP), cryptographic processor, multimedia processor, media processors, programmable System-on-a-Chips (SOC), and can be used in developing processors or coprocessors for providing cryptography and multimedia operation. In particular, the CROSS instruction can permute sixty-four 1-bit subwords in a 64-bit processor for use in, for example, encryption and decryption processing using software. The CROSS instruction can also permute multi-bit subwords as described below, for example, thirty-two 2-bit subwords, sixteen 4-bit subwords, eight 8-bit subwords, four 16-bit subwords or two 32-bit subwords in a 64-bit processor for use for example in multimedia processing.

Figures 3B, 3C:
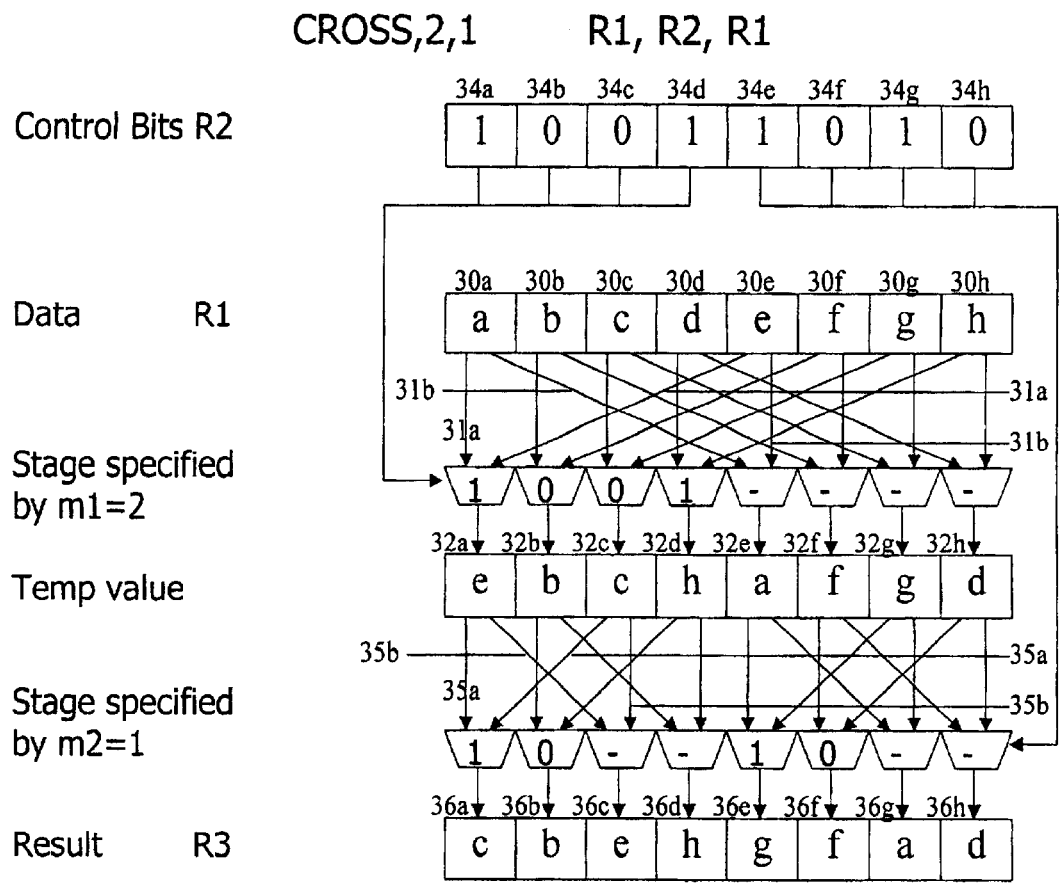
FIG. 3B is a schematic diagram of an implementation of a CROSS instruction in accordance with an embodiment of the present invention.
FIG. 3C is a schematic diagram of a layout of a CROSS instruction in accordance with an embodiment of the present invention.

FIG. 3B illustrates an example of operation of a CROSS instruction. The source sequence of bits consists of 8 bits: bit a, bit b, bit c, bit d, bit e, bit f and bit h. The CROSS instruction is CROSS, 2, 1, R1, R2, R3 wherein the source sequence of bits in register R1 is referred to by abcdefgh, the control bits of R2 are 10011010 and the destination sequence of bits received in register R3 is cbehgfad. Each of bit positions 30a–30h in source register R1 acts as an input node to this Benes network: node 30a receives bit a, node 30b receives bit b, node 30c receives bit c, node 30d receives bit d, node 30e receives bit e, node 30f receives bit f, node 30g receives bit g and node 30h receives bit h.

Each node 30a–30h has two outputs 31a and 31b. Outputs 31a and 31b for each of nodes 30a–30h are configured such that the distance between conflict pairs is 4 as specified by m1=2. Outputs 31a and 31b for each of nodes 30a–30h are each directed to one node in set of nodes 32a–32h. For example, output 31a of node 30a is directed to node 32a and output 31b of node 30a is directed to node 32e. Output 31a of node 30e is directed to node 32a and output 31b of node 30e is directed to node 32e. Accordingly, node 30a and node 30e are conflict inputs and respective nodes 32a and 32e receive conflict outputs. Similarly, node 30b and node 30f are conflict inputs and respective nodes 32b and 32f receive conflict outputs. Node 30c and node 30g are conflict inputs and respective nodes 32c and 32g receive conflict outputs. Node 30d and 30h are conflict inputs and respective nodes 32d and 32h receive conflict outputs.

Left half of configuration bits R2 are applied to each pair of conflict outputs and are represented in the first node of each pair of conflict outputs. Accordingly, configuration bit 34a is applied to nodes 32a and 32e, configuration bit 34b is applied to nodes 32b and 32f, configuration bit 34c is applied to nodes 32c and 32g and configuration bit 34d is applied to nodes 32d and 32h.

During the first basic operation, node 30a and node 30e have crossing paths to nodes 32a and 32e since the configuration bit 34a is 1. Node 30b and node 30f have non-crossing paths to nodes 32b and 32f since configuration bit 34b is 0. Node 30c and node 30g have non-crossing paths to nodes 32c and 32g since configuration bit 34c is 0. Node 30d and node 30h have crossing paths to nodes 32d and 32h since configuration bit 34d is 1. After the first basic operation, the intermediate sequence of bits is ebchafgd.

Each of nodes 32a–32h has two outputs 35a and 35b. Outputs 35a and 35b for each of nodes 32a–32h are configured such that the difference between conflict pairs is 2 as specified by m2=1. Outputs 35a and 35b are each directed to one node in set of nodes 36a–36h. For example, output 35a of node 32a is directed to node 36a and output 35b of node 32a is directed to node 36c. Similarly, output 35a of node 32c is directed to node 36a and output 32b of node 32c is directed to node 36c. Accordingly, node 32a and node 32c receive conflict inputs and respective nodes 36a and 36c receive conflict outputs. Conflict outputs are also received at the respective pairs of node 36b and 36d, nodes 36e and 36g, nodes 36f and 36h. Right half of configuration bits of R2 are applied to each pair of conflict outputs. Accordingly, configuration bit 34e is applied to nodes 36a and 36c, configuration bit 34f is applied to nodes 36b and 36d, configuration bit 34g is applied to nodes 36e and 36g and configuration bit 34h is applied to node 36f and 36h.

During the second basic operation, node 32a and 32c have crossing paths to nodes 36a and 36c since configuration bit 34e is 1. Node 32b and 32d have non-crossing paths to nodes 36b and 36d since configuration bit 34f is 0. Node 32e and node 32g have crossing paths to nodes 36e and 36g since configuration bit 34g is 1. Node 32f and node 32h have crossing paths to node 36f and 36h since configuration bit 34h is 1. After the second operation, the result sequence of bits is cbehgfad.

FIG. 3C shows a one embodiment of the encoding of the CROSS instruction 39 for use in a programmable processor. The instruction may also contain other fields. As will be understood by persons of ordinary skill in the art, relative locations of the fields in an instruction is arbitrary and may be varied without violating the spirit of the invention.

Figure 4A:
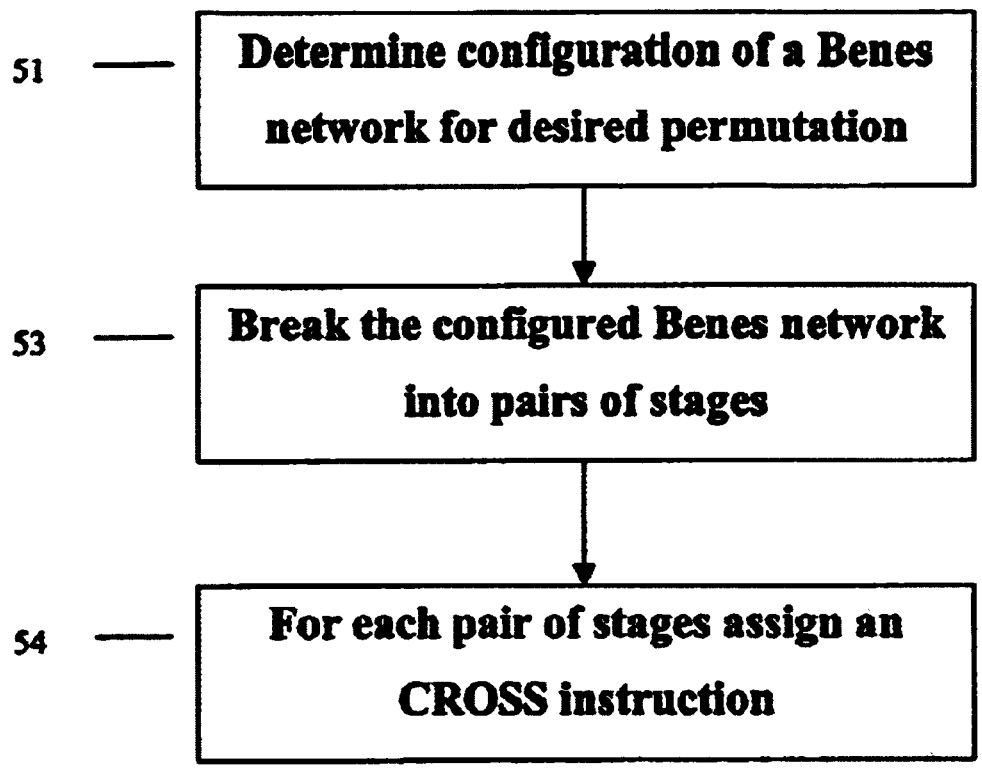
FIG. 4A is a flow diagram of a method for implementing a CROSS instruction sequence to do an arbitrary permutation.
Figure 4B:
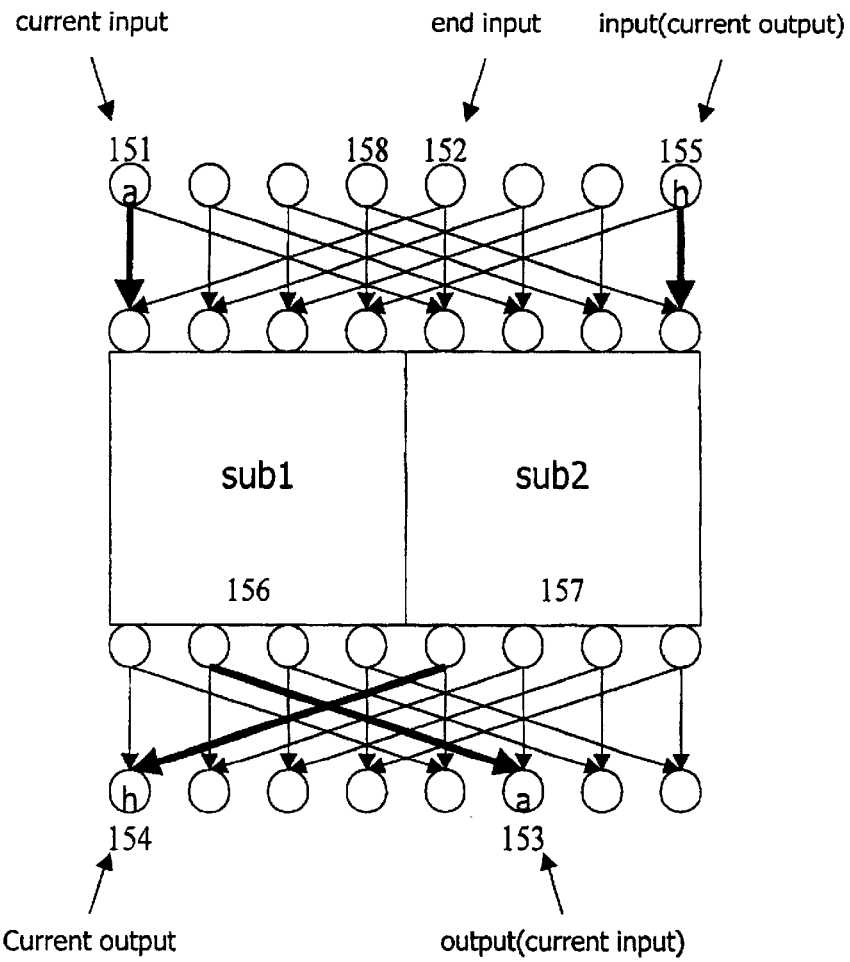
FIG. 4B is a schematic diagram for obtaining configuration bits for an 8-input Benes network based on hierarchical partitioning into subnets.

A method for implementing CROSS instructions to do arbitrary permutations is shown in FIG. 4A. In block 51, a Benes network configuration is determined for the desired permutation. A Benes network can be configured as described in X. Yang, M. Vachharajani and R. B. Lee, "Fast Subword Permutation Instructions Based on Butterfly Networks", *Proceedings of SPIE, Media Processor* 2000, pp. 80–86, January 2000, herein incorporated by reference. FIG. 4B illustrates the following steps for configuring a Benes network:

1. "Inputs" and "outputs" refer to the inputs and outputs of current Benes network. Starting from the first input that is not configured, referred to as "current input", set the "end input" to be the conflict input of the "current input". If all "inputs" have already been configured, go to Step 4.

2a. Connect "current input" to the sub-network "sub 1" that is on the same side as "current input". Connect the output that has the same value as "current input", to sub1 and call it "output (current input)". Set "current output" to the conflict output of "output (current input)" and go to Step 3.

2b. Connect "current input" to the sub-network "sub1" such that "sub1" is not "sub2". Connect the output that has the same value as "current input", to sub1 and call it "output (current input)". Set "current output" to the conflict output of "output (current input)".

3. Connect "current output" to sub-network "sub2" such that "sub2" is not "sub1". Also connect the input that has the same value as "current output", call it "input (current output)", to "sub2". If "input (current output)" is the same as "end input", go back to Step 1. Otherwise set "current input" to the conflict input of "input (current output)" and go to Step 2b.

4. At this point, all the "inputs" and "outputs" have been connected to the two sub-networks. If the configuration of the two sub-networks is trivial, i.e. n=2, the configuration is done. Otherwise for each sub-network, treat it as a full Benes network and repeat the steps beginning at Step 1.

FIG. 4B illustrates the above steps for permutation (a------h) to (h----a--), where "-" means do-not-care. Starting from an unconfigured Benes network 150, the first input that is not configured is node 151, which contains value a. We mark node 151 as "current input" and its conflict input, node 152 as "end input". We then connect node 151 to the subnet 156 that is on the same side as node 151. The output that has the value a is node 153, we mark it as "output (current input)". We connect node 153 to subnet 156, which is the same subnet as node 151 is connected to. The conflict output of node 153 is node 154, which contains value h. We refer to node 154 as "current output". Node 154 is connected to subnet 157 that is not 156. The input that contains value h is node 155, we mark it as "input (current output)" and connect it to subnet 157 as well. Since node 155 is different from "end input", or node 152. We set "current input" to the conflict input of node 155, which is node 158, and repeat the above steps. This process terminates when all the inputs and outputs of Benes network 150 are configured. Thereafter, for each of subnets 156 and 157, we treat it as a full Benes network and apply the whole process on it until the whole Benes network 150 is configured.

In block 53 of FIG. 4A, the configured Benes network is broken into pairs of stages. In block 54, a CROSS instruction is assigned for each pair of stages. The first CROSS instruction takes the original input. Thereafter, each CROSS instruction uses the output from the last CROSS instruction as input and produces input for the next CROSS instruction. The last CROSS instruction generates the final permutation. Accordingly, since there are 2lgn stages in an n-input Benes network, all possible permutations can be performed for subwords in an n-bit register using lgn CROSS instructions.

Figure 5:
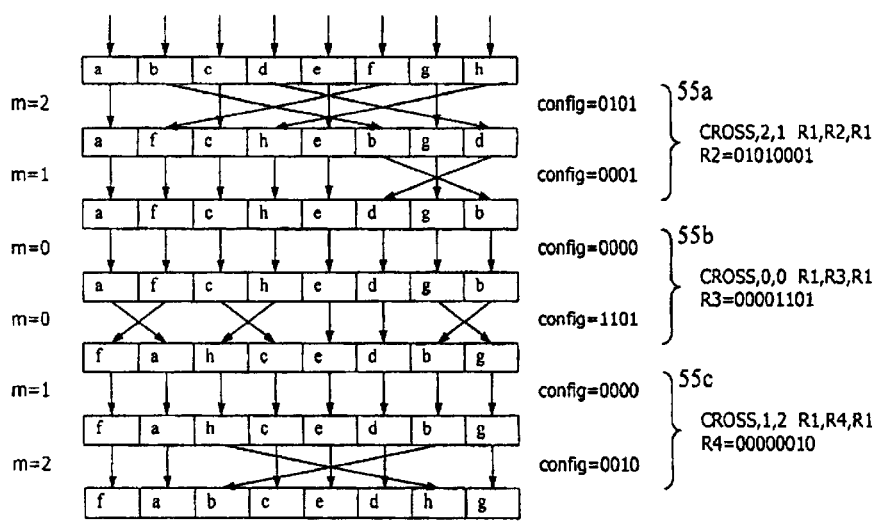
FIG. 5 is a schematic diagram of a Benes network configured for a given permutation.

For example, a Benes network configured for the permutation (abcdefgh)→(fabcedhg) is shown in FIG. 5. Configuration bits are determined for each node. These configuration bits are the contents of the configuration registers R2, R3 and R4. The configuration bits are read from left to right through nodes from left to right. The Benes network is broken into stages 55a–55c, by performing block 53. Performing block 54, the CROSS instruction CROSS 2, 1 R1, R2, R1 is assigned to stage 55a with the configuration bits of R2=01010001. CROSS instruction CROSS 0, 0 R1, R3, R1 is assigned to stage 55b with the configuration bits of R3=00001101. CROSS instruction CROSS 1, 2, R1, R4, R1 is assigned to stage 55c with the configuration bits of R4=00000010.

Figure 6:
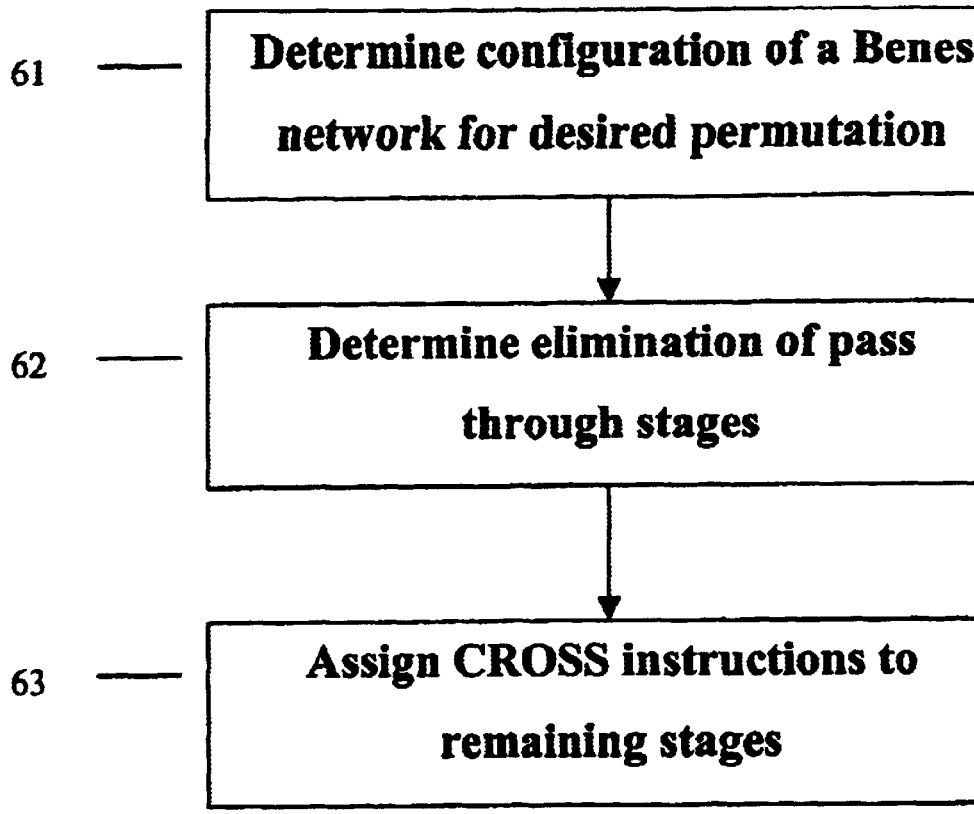
FIG. 6 is a flow diagram of a method for permutations of multi-bit subwords in accordance with an embodiment of the present invention.
Figure 7A:
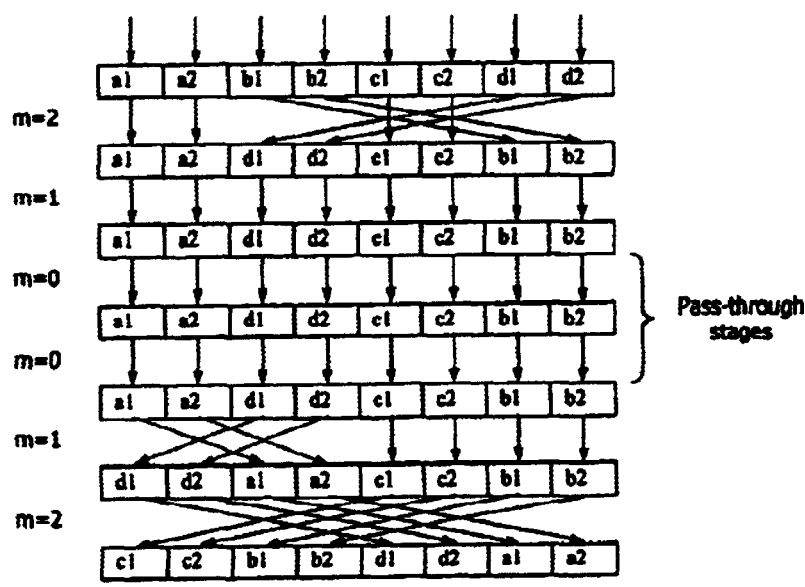
FIG. 7A is a schematic diagram of a Benes network configured for a multi-bit permutation including pass through stages.
Figures 7B, 8A:
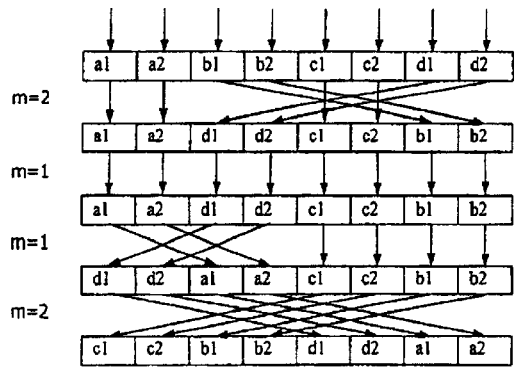
FIG. 7B is a schematic diagram of the Benes network of FIG. 7A after elimination of pass through stages.
FIG. 8A is a flow diagram of a method for 2n-bit permutations in accordance with an embodiment of the present invention.

A schematic diagram of a method for permuting multi-bit subwords 60 is shown in FIG. 6 in which each subword contains more than one bit. Multi-bit subwords can be represented as k-bit subword permutation. Block 61 is identical to block 51 in FIG. 4A. In block 62, a determination is made for eliminating pass through stages. For many permutations, some stages of the Benes network can be configured as pass-throughs. This is true even for some permutations that are not subword permutations. Because the bypassing connections only serve to copy the inputs to the outputs, these stages can be removed before the assignment of the CROSS instructions. For example if 2k stages are removed, there will be k fewer instructions. An example of an implementation of method 60 is shown in FIGS. 7A and 7B. FIG. 7A illustrates the configuration of an 8 input Benes network for a 2-bit permutation of $(a_1a_2b_1b_2c_1c_2d_1d_2) \rightarrow (c_1c_2b_1b_2d_1d_2a_1a_2)$ in which the middle 2 stages of the Benes network copy the input bits to their output without any change of order as determined from block 62. The middle stages are eliminated from the configured Benes network as shown in FIG. 7B. In block 63, the instructions are assigned to the remaining stages without affecting the result. In general, when permuting k-bit subword in an n-bit word, the middle 2lgk stages of the Benes network are configured as pass-throughs. Some other stages may be configured as pass-throughs and thus can be removed as well. Accordingly, when permuting k-bit subwords in an n-bit word, the maximum number of instructions needed becomes lgn−lgk=lg(n/k)=lgr, where r is the number of subwords in a word.

Figure 8B:
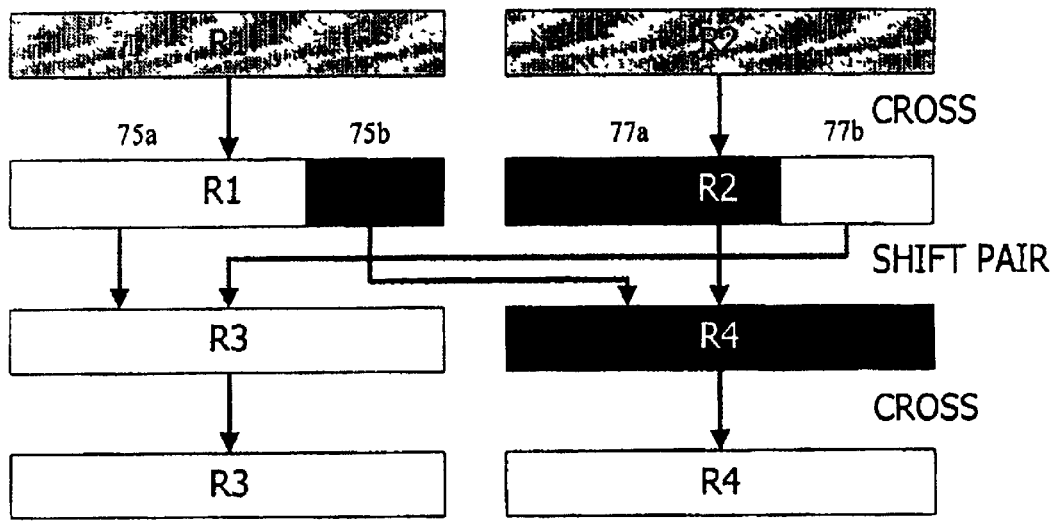
FIG. 8B is a schematic diagram of an implementation of the method shown in FIG. 8A.

The CROSS instruction can be used to permute subwords packed into more than one register. If a register is n bits, two registers are 2n bits. The CROSS instructions can be used for 2n-bit permutations by using an instruction such as the SHIFT PAIR instruction in PA-RISC, as described in Ruby Lee, "Precision Architecture", *IEEE Computer*, Vol. 22, No. 1, pp. 78–91, January 1989, and Ruby Lee, Michael Mahon, Dale Morris, "Pathlength Reduction Features in the PA-RISC Architecture", *Proceedings of IEEE Compcon*, pp. 129–135, Feb. 24–28, 1992, San Francisco, Calif., , hereby incorporated by reference into this application. The SHIFT PAIR instruction can process operands that cross word boundaries. This instruction concatenates two source registers to form a double-word value, then extracts any contiguous single-word value. FIGS. 8A and 8B illustrate an example of performing 2n-bit permutations using SHIFT PAIR and CROSS instructions. In this example, source registers R1 and R2 store the bits to be permuted and the results are put in destination register referred to by R3 or R4.

In block 70, the bits of the source registers R1 and R2 are divided into two groups using two CROSS instruction sequences. One CROSS instruction sequence is for R1 and one CROSS instruction sequence is for R2. For example, for R1, the bits going to register R3 are put into a left group and the bits going to R4 into the right group. In R2 the bits going to register R4 are put into a left group, and the bits going to register R3 are put into a right group. After performing block 70, register R1 is divided into left group 75a and right group 75b as shown in FIG. 8B. Register R2 is divided into left group 77a and right group 77b.

In block 71, using two SHIFT PAIR instructions, all bits going to register R3 are put into R3 and all bits going to register R4 are put into R4. After the implementation of block 71, register R3 includes the bits of left group 75a and right group 77b and register R4 includes the bits of right group 75b and left group 77a. In block 72, considering R3 and R4 as separate n-bit words, n-bit permutations are performed on register R3 and register R4. Each of R3 and R4 can use up to 1gn instructions. In total, excluding the instructions needed for loading control bits, 41gn+2 instructions are needed to do a 2n-bit permutation. Accordingly, with 64-bit registers, a 128-bit permutation can be performed with 26 instructions.

Figure 9A:
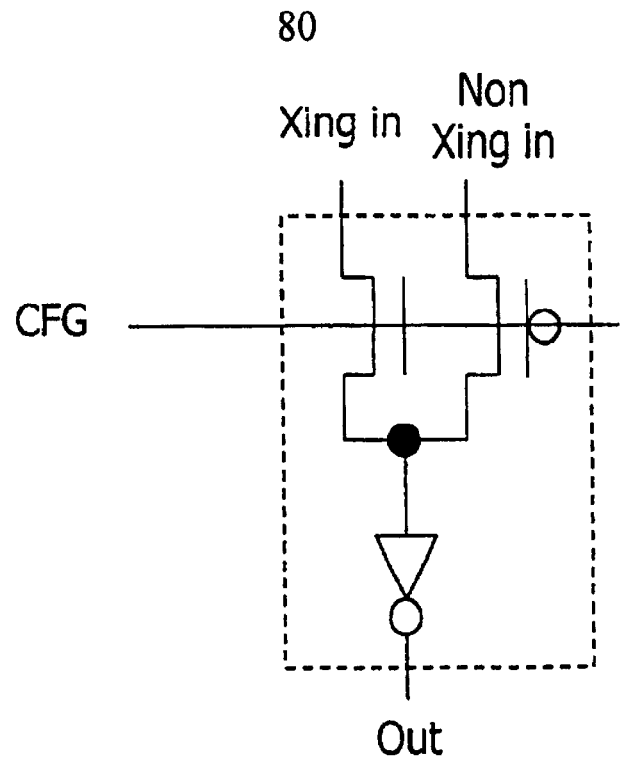
FIG. 9A is a schematic diagram of a circuit implementation of CROSS instructions for an individual node.
Figure 9B:
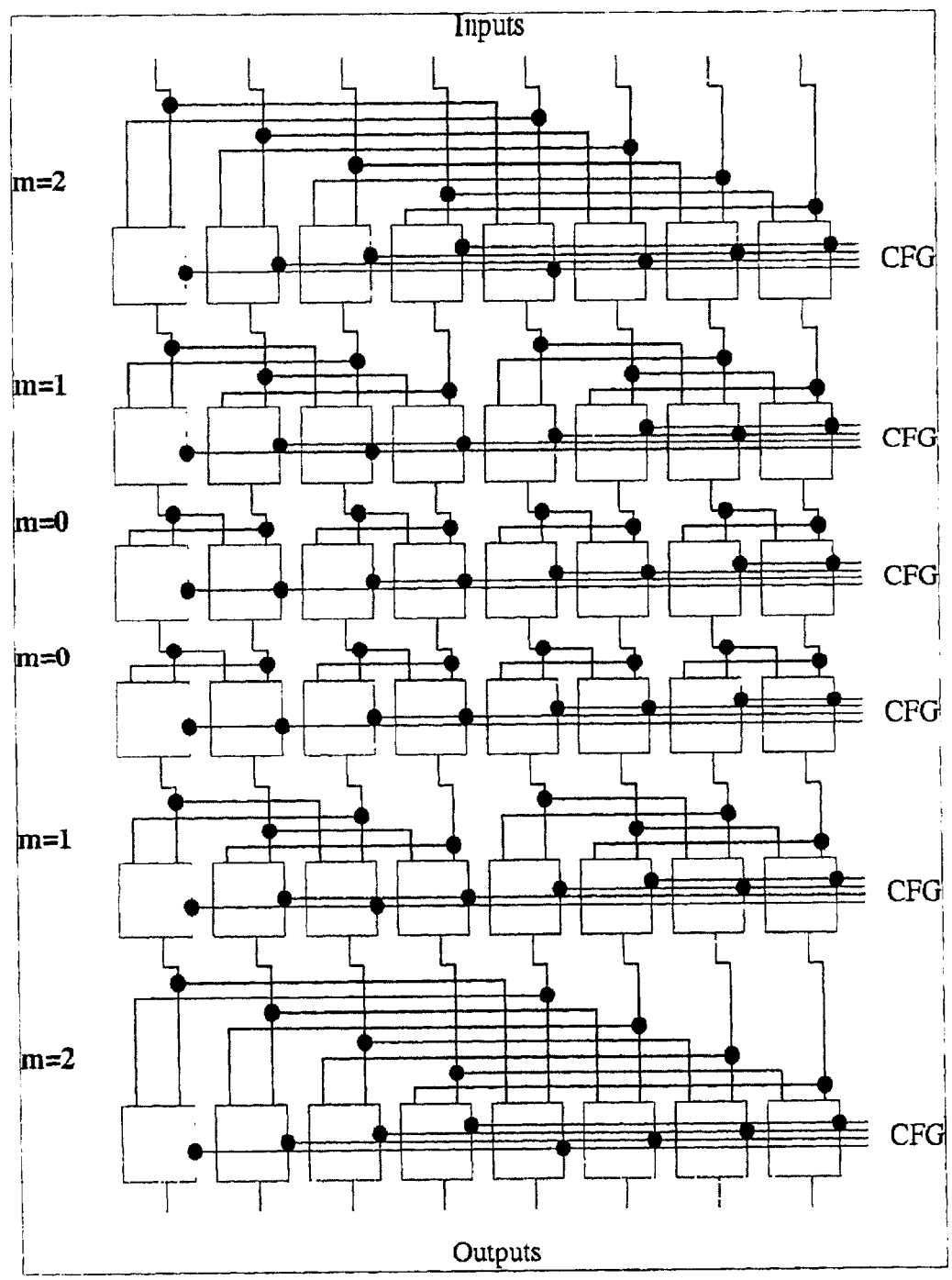
FIG. 9B is a schematic diagram of a circuit implementation of CROSS instructions for an 8-bit implementation.
Figure 10A:
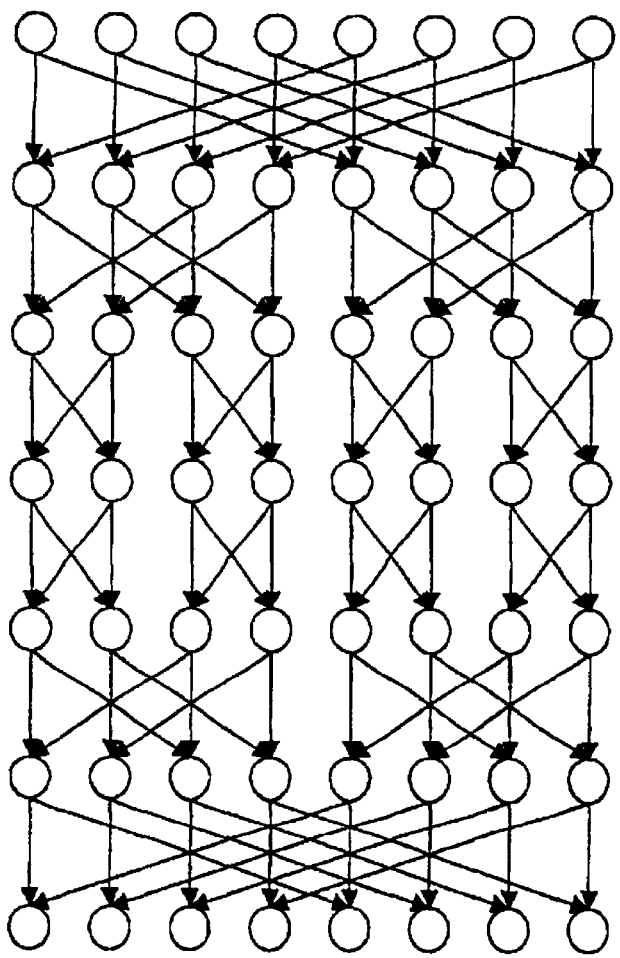
FIG. 10A is a high-level schematic diagram of a circuit implementation for CROSS instructions in accordance with an embodiment of the present invention.

FIGS. 9A and 9B illustrate schematic diagrams of a circuit implementation for CROSS instruction corresponding to the high level diagram of 100 as shown in FIG. 10A, for an individual node 80 and 8-bit implementation 90. The CROSS instruction can be implemented by implementing at the circuit level a Benes network. An n-input Benes network has 2n1gn switch points. When executing a CROSS, m1, m2 R1, R2, R3 instruction, the control logic selects the two stages for the two basic operations based on the value of m1 and m2. Because the Benes network has two of each butterfly stage, stages can always be selected for all possible m1 and m2. The left and right half of R2 are used to configure the two stages selected and all the other stages are configured as pass-throughs. The source R1 is put through the configured network, and the result R3 is obtained. The method of the present invention can do arbitrary bit permutations of a 64-bit word with a maximum of 1g64=6 CROSS instructions. For 2-bit subwords, at most 1g(64/2)=5 instructions are needed and for 4-bit subwords, at most 1g(64/4)=4 instructions are needed.

Figure 10B:
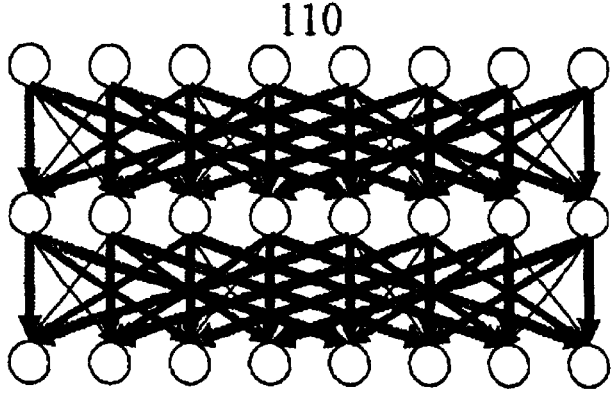
FIG. 10B is a high-level schematic diagram of a circuit implementation for CROSS instructions in accordance with an alternate embodiment of the present invention.

FIG. 10A illustrates one embodiment of a high-level schematic diagram of a circuit implementation 100 for CROSS instructions for an 8 bit system. The circuit implementation implements the entire Benes network. When executing a CROSS instruction, the control logic selects the proper two stages for the two basic operations based on the parameters m1 and m2. Thereafter, the CROSS instruction configures the two selected stages according to the left half and right half of the configuration register R2. The stages that are not used are configured as pass-throughs. FIG. 10B illustrates another embodiment of a high-level schematic diagram of a circuit implementation 110 for CROSS instructions. The circuit implementation implements two identical stages. Each stage comprises all the connections of all the stages of a butterfly network. When executing a CROSS instruction, the control logic selects the proper two sets of connections for the two basic operations based on the parameters m1 and m2. Thereafter, the CROSS instruction configures the two selected sets of connections according to the left half and right half of the configuration register R2.

In another embodiment of the invention, two or more different butterfly stages are combined in one stage of the implementation.

Figure 12A:
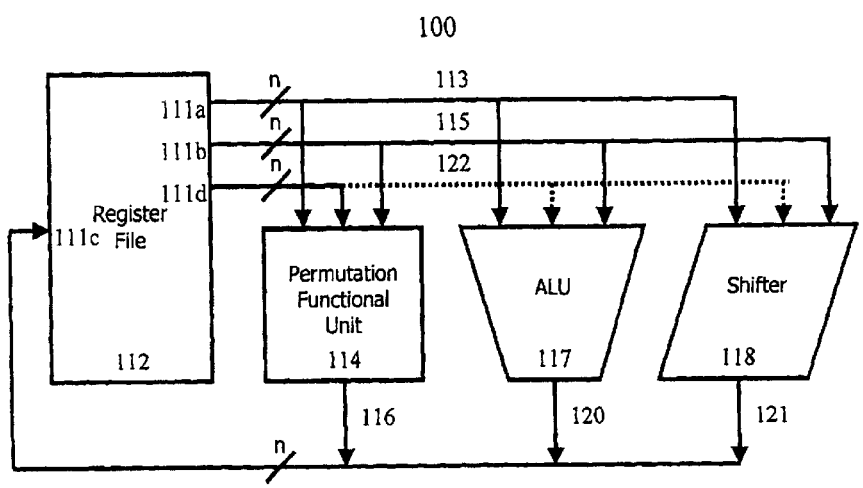
FIG. 12A is a schematic diagram of a system for implementing permutation instructions in accordance with an alternate embodiment of the present invention.

FIG. 12A illustrates an alternate embodiment of the invention, in which a single permute instruction can perform more than two Benes stages. In system 100 register file 112 includes three read ports, 111a, 111b, 111c. Two registers 111b and 111c can be used to send configuration bits 115 and 122 to permutation unit 114. Accordingly, system 100 allows four Benes stages to be performed in one permute instruction. This allows any arbitrary permutation of n bits to be performed in an instruction sequence of (21gn)/4, or 1gn/2 instructions. As is understood by one of ordinary skill in the art, this can be extended to sending more configuration bits with each permute instruction, thus performing more Benes stages per instruction, and reducing the number of instructions in the instruction sequence needed for any arbitrary permutation of n bits. The minimum number of instructions needed in one instruction is achieved by sending 1gn registers with configuration bits with the one register of n bits to be permuted in the permute instruction. Accordingly, this allows any arbitrary permutation of n bits to be performed in an instruction sequence of 21gn/m instructions where m is the number of network stages performed by one permutation instruction.

Figure 12B:
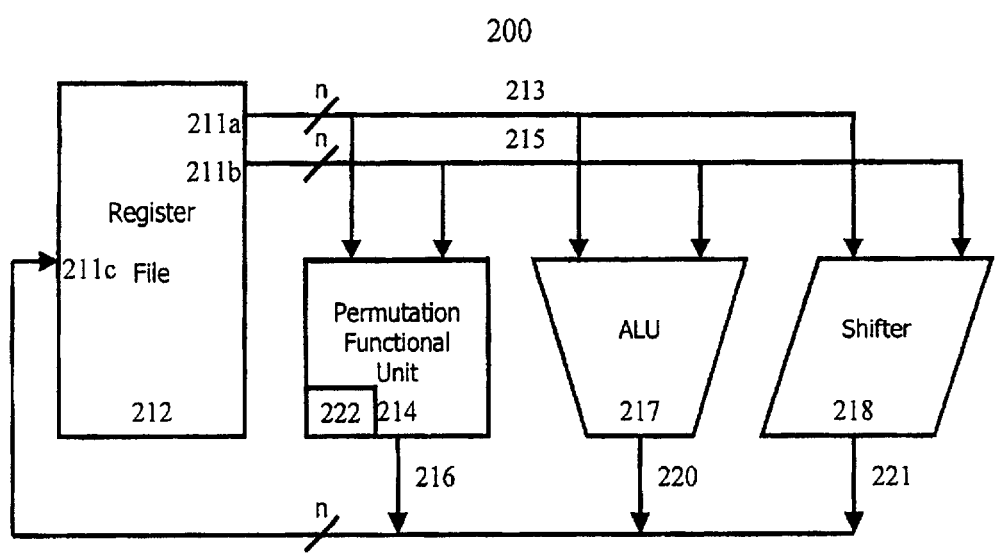
FIG. 12B is a schematic diagram of a system for implementing permutation instructions in accordance with another alternate embodiment of the present invention.

FIG. 12B illustrates an alternate embodiment of the invention, in which the permutation result can be temporarily stored in permutation functional unit 214. In system 200, bits of intermediate permutation result 216 are stored in memory location 222 of permutation functional unit 214 after the generation of intermediate permutation result 216. In a subsequent execution of a permutation instruction, the source bits can be used from memory location 222 instead of being fetched from register file 212. During the subsequent execution, both of source registers 211a and 211b are used for configuration bits in a permutation instruction. Accordingly, the desired permutation can be performed in fewer instructions.

In an alternate embodiment of using system 200 all of the n1gn configuration bits are stored in the memory 222, rather than read from the register 211b (or from the registers 111b and 111d in FIG. 12A). The n-bit value 213 to be permuted is read from register 211a and sent to the permutation functional unit 214. This embodiment is useful if the same n-bit permutation is repeated many times for different n-bit values. The sequence of permutation instructions needed to perform this n-bit permutation is reduced to one instruction.

In an alternate embodiment using system 200 of FIG. 12B, only (n−1)1gn configuration bits are stored in memory 222. This allows a small subset of n-bit permutations to be performed in one instruction, by reading n configuration bits 215 from register 211b and sending this with the n-bit value 213 from register 211a to permutation unit 214.

The CROSS instruction, in any of the above described embodiments, can be used by itself, rather than in a sequence of instructions. The CROSS instruction generates a subset of all possible permutations.

A permutation performed by a single CROSS instruction can be reversed by reversing the order of the stages used in the CROSS instruction with the configuration bits for each stage being the same as for the original permutation. For example, the permutation achieved by CROSS,2,1 R1, R2, R1, where R2=10000101 can be reversed by doing CROSS, 1,2 R1, R3, R1, where R3=01011000.

Horizontal and vertical track counts and transistor counts have been calculated for a circuit implementation of CROSS instruction based on the Benes network of the present invention and are compared to a circuit implementation of a cross bar network for 8-bit and 64-bit permutations in Table 2. The numbers in Table 2 are computed as follows:

For the CROSS instruction implementation, the following relationships are used,

Vertical Tracks=2n $$\text{Horizontal Tracks} = 21gn \times \frac{n}{2} + 2 \times (2n - 2)$$
$$= n\,1gn + 4n - 4$$

Transistors=$2n1gn \times 4 = 8n1gn$

The 2n horizontal tracks come from the 2 input lines in each node. The number of horizontal tracks is composed of two parts: n/2 configuration lines per stage for the 21gn stages, and the number of data tracks needed between adjacent stages, which is 2×(2n−2) in total. The 8n1gn transistors are from 4 transistors in each cell for 2n1gn cells.

Figure 11:
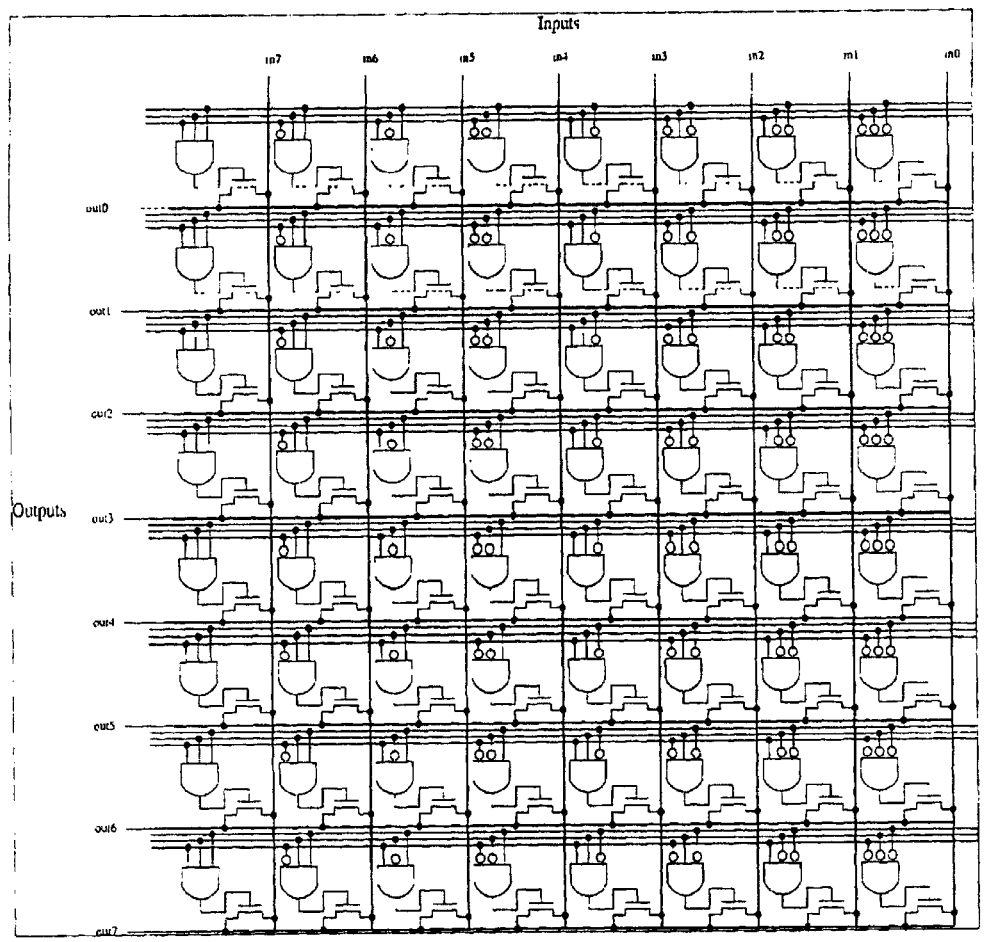
FIG. 11 is a schematic diagram of a circuit implementation of an 8×8 crossbar for comparison with the circuit implementation of OMFLIP instructions.

For implementation of an 8-input crossbar network as shown in FIG. 11,

Vertical Tracks=n

Horizontal Tracks=$n \times (1+1gn) = n + n1gn$ $$\text{Transistors} = n \times \left( n + \sum_{i=0}^{1gn} \binom{1gn}{i}(21gn + 2i) \right)$$
$$= O(n^2 1gn) > 3n^2 1gn$$

The vertical tracks consist of the n input data lines. The horizontal tracks consist of the n output data lines and the 1gn configuration lines for each output data line. The number of transistors are for the AND gate and pass transistor at each cross point. An alternative implementation of crossbar is to provide a negated signal for each control signal so that no inverters before AND gates are needed. Then the horizontal track count becomes n+2n1gn and the transistor count becomes $n^2(1+21gn)$. This implementation may yield a larger size due to more vertical tracks used.

From these equations, it is shown that when n is large, the CROSS instructions yield the smaller size. As shown in table 2, the CROSS circuit implementation yields much smaller transistor count and reasonable track counts for permutations of 64 bits. Accordingly, it yields more area-efficient implementation. Control logic circuits for generating the configuration signals, which are more complex for the crossbar than for CROSS, were not counted.

TABLE 2

|  |  | Vertical tracks | Horizontal tracks | Transistors |
|---|---|---|---|---|
| 8-bit permutations | benes (cross) | 16<br>16(data) | 52<br>28(data) | 192 |

TABLE 2-continued

| | | Vertical tracks | Horizontal tracks | Transistors |
|---|---|---|---|---|
| | Cross-bar | 8<br>8(data) | 24(control)<br>32<br>8(data) | 640 |
| 64-bit permutations | Benes (cross) | 128<br>128(data) | 24(control)<br>636<br>252(data)<br>384(control) | 3072 |
| | Cross-bar | 64<br>64(data) | 448<br>64(data)<br>384(control) | >73728 |

Table 3 shows a comparison of the number of instructions needed for permutations of a 64-bit word with different subword sizes for method 10 using CROSS instructions and a method using conventional instruction set architectures (ISAs).

TABLE 3

| Subword size in bits | Num of subwords in register | Max[a] num of CROSS | existing ISAs |
|---|---|---|---|
| 1 | 64 | 6 | 30[b] |
| 2 | 32 | 5 | 30[b] |
| 4 | 16 | 4 | 30[b] |
| 8 | 8 | 3 | 1[c,d] |
| 16 | 4 | 2 | 1[a] |
| 32 | 2 | 1 | 1[a] |

[a]The maximum number here is lgn.
[b]Instruction counts using table lookup methods, actual cycle counts will be larger due to cache misses.
[c]Using subword permutation instructions.
[d]Only VPERM in AltiVec is able to do this in one instruction.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed is:

1. A method of performing an arbitrary permutation of a source sequence of bits in a programmable processor comprising the steps of:
   a. defining an intermediate sequence of bits that said source sequence of bits is transformed into with a configuration of a Benes network;
   b. determining a permutation instruction for transforming said source sequence of bits into said intermediate sequence of bits; and
   c. repeating steps a. and b. using said determined intermediate sequence of bits from step b. as said source sequence of bits in step a. until a desired sequence of bits is obtained,
   wherein the determined permutation instructions form a permutation instruction sequence.

2. The method of claim 1 wherein said Benes network comprises two butterfly networks of the same size connected back-to-back.

3. The method of claim 1 wherein the permutation instruction comprises an opcode indicating the configuration of said Benes network, a reference to a source register which contains said source sequence of bits, and a reference to one or more configuration registers which contain configuration bits, and optionally a reference to a destination register to which said intermediate sequence of bits or said desired sequence of bits is placed.

4. The method of claim 3 wherein said opcode comprises a set of parameters, a first parameter indicating a first basic operation and a second parameter indicating a second basic operation.

5. The method of claim 3 wherein a first set of said configuration bits determines movement of said source sequence of bits in said source register to said intermediate sequence of bits and a second set of a subsequent intermediate sequence of bits or said configuration bits determines movement of said intermediate sequence of bits into said destination register.

6. The method of claim 5 wherein said first basic operation is specified by parameter $m_1$, wherein $2^{m_1}$ is a distance between conflict pairs of a stage of said Benes network and said second basic operation is specified by parameter $m_2$, wherein $2^{m_2}$ is a distance between conflict pairs of a stage of said Benes network.

7. The method of claim 3 including a plurality of sets of said configuration bits, wherein a first set of said configuration bits determines movement of said source sequence of bits in said source register to said intermediate sequence of bits during said first operation and a second set of said configuration bits determines movement of said intermediate sequence of bits into said destination register or a second intermediate sequence of bits during said second operation.

8. The method of claim 4 wherein said opcode comprises a plurality of parameters with each of said parameters indicating which said stage in a Benes network is used.

9. The method of claim 7 wherein each of said configuration bits is applied to a pair of conflict outputs of said Benes network.

10. The method of claim 5 wherein said permutation instruction is assigned to two or more stages of said Benes network.

11. The method according to claim 10 wherein said permutation instruction comprises a reference to two configuration registers, and four stages of said Benes network are used.

12. The method of claim 1 wherein at most 21 gr/m said permutation instructions are included in said permutation instruction sequence, wherein r is the number of subwords in said sequence of bits, each said subword comprising one or more bits, and m is the number of network stages performed by one permutation instruction.

13. The method of claim 1 wherein said programmable processor is a microprocessor, digital signal processor, media processor, multimedia processor, cryptographic processor, or programmable System-on-a-Chip(SOC).

14. The method of claim 1 wherein said source sequence of bits is formed in subwords of two or more of said bits and further comprising the steps of:
   after step c, determining pass through stages in said Benes network; and
   eliminating said pass through stages.

15. A method of performing an arbitrary permutation of a source sequence of bits in a programmable processor comprising the steps of:
   a. defining an intermediate sequence of bits that said source sequence of bits is transformed into with a configuration of a Benes network;
   b. determining a permutation instruction for transforming said source sequence of bits into said intermediate sequence of bits;
   c. storing said determined intermediate sequence of bits; and d. determining a subsequent permutation instruction using said stored intermediate sequence of bits.

16. The method of claim 15 further comprising repeating step c. and d. until a desired sequence of bits is obtained, wherein the determined permutation instructions form a permutation instruction sequence.

17. A method of performing an arbitrary permutation of a source sequence of bits in a programmable processor said source sequence of bits is packed into a plurality of source registers comprising the steps of:
   a. dividing bits of a first of said source registers to be placed in a first destination register into a first group and bits of said first of said source registers to be placed in a second destination register into a second group with a first permutation instruction sequence;
   b. dividing bits of a second of said source registers to be placed in said first destination register into a first group and bits of said second of said source registers to be placed in a second destination register into a second group with a second permutation instruction sequence;
   c. placing bits of said first group of said first of said source registers and said bits of said first group of said second of said source registers into said first destination register;
   d. placing bits of said second group of said first of said source registers and said second group of said second of said registers into said second destination register;
   e. defining a sequence of bits of said first destination register as a first source sequence of bits and a sequence of bits of said second destination register as a second source sequence of bits;
   f. defining an intermediate sequence of bits that each of said first source sequence of bits and said second source sequence of bits is transformed into using a Benes network;
   g. determining a permutation instruction for transforming said first source sequence of bits and said second source sequence of bits into respective said intermediate sequence of bits; and
   h. repeating steps f. and g. using said determined intermediate sequence of bits from step g. as said source sequence of bits in step e. until a respective desired sequence of bits is obtained for said first source sequence of bits and said second source sequence of bits,
   wherein the determined permutation instructions form a permutation instruction sequence.

18. The method of claim 17 wherein said programmable processor is a microprocessor, digital signal processor, media processor, multimedia processor, cryptographic processor, or programmable System-on-a-Chip(SOC).

19. The method of claim 17 wherein at most 41gn+2 instructions are included in said permutation instruction sequence, wherein n is the number of subwords in said sequence of bits, each said subword comprising one or more bits.

20. The method of claim 1 wherein said permutation is reversed by the steps of reversing an order of each of said stages in said Benes network.

21. A method for performing a permutation of a source sequence of bits in a programmable processor comprising the steps of:
   defining an intermediate sequence of bits that said source sequence of bits is transferred into using an Benes network; and
   determining a sequence of one or more permutation instructions for transferring said source sequence of bits into said intermediate sequence of bits and optionally one or more subsequent intermediate sequences of bits until a desired sequence of bits is obtained.

22. The method of claim 1 wherein said Benes network comprises two butterfly networks of the same size connected back-to-back.

23. The method of claim 22 wherein said permutation instruction is assigned to two or more stages of said Benes network.

24. A system of performing an arbitrary permutation of a source sequence of bits in a programmable processor comprising:
   means for defining an intermediate sequence of bits that said source sequence of bits is transformed into using Benes network stages; and
   means for determining a permutation instruction for transforming said source sequence of bits into one or more intermediate sequence of bits until a desired sequence of bits is obtained,
   wherein each intermediate sequence of bits is used as input to a subsequent permutation instruction and the determined permutation instructions form a permutation instruction sequence.

25. The system of claim 24 wherein the permutation instruction comprises an opcode indicating the configuration of said Benes network, a reference to a source register which contains said source sequence of bits, a reference to one or more configuration registers which contains configuration bits, and optionally a reference to a destination register to which said intermediate sequence of bits or said desired sequence of bits is placed.

26. The system of claim 25 wherein said opcode comprises a set of parameters, a first parameter indicating a first basic operation and a second parameter indicating a second basic operation.

27. The system of claim 26 wherein said first basic operation is specified by parameter $m_1$, wherein $2^{m_1}$ is a distance between conflict pairs of a stage of said Benes and said second basic operation is specified by parameter $m_2$, wherein $2^{m_2}$ is a distance between conflict pairs of a stage of said Benes network.

28. The system of claim 25 including a plurality of sets of configuration bits, wherein a first set of said configuration bits determines movement of said source sequence of bits in said source register to said intermediate sequence of bits during said first operation and a second set of said configuration bits determines movement of said intermediate sequence of bits into said destination register or a second intermediate sequence of bits during said second operation.

29. The system of claim 27 wherein a first set of said configuration bits determines movement of said source sequence of bits in said source register to said intermediate sequence of bits and a second set of a subsequent intermediate sequence of bits or said configuration bits determines movement of said intermediate sequence of bits into said destination register.

30. The system of claim 29 wherein each of said configuration bits is applied to a pair of conflict outputs of said Benes network.

31. The system of claim 30 wherein said first basic operation is specified by parameter $m_1$, wherein $2^{m_1}$ is a distance between conflict pairs of a stage of said Benes network and said second basic operation is specified by parameter $m_2$, wherein $2^{m_2}$ is a distance between conflict pairs of a stage of said Benes network.

32. The system of claim 24 wherein said permutation instruction is assigned to a pair of stages of said Benes network.

33. The system according to claim 24 wherein said permutation instruction comprises a reference to two configuration registers, andfour stages of said Benes network are used.

34. The system of claim 24 further comprising means for reversing an order of each of said stages in said Benes network.

35. The system of claim 24 wherein at most 21gr/m said permutation instructions are included in said permutation instruction sequence, wherein r is the number of subwords in said sequence of subwords in said sequence of bits, each said subword comprising one or more bits, and m is the number of network stages performed by one permutation instruction.

36. The system of claim 24 wherein said programmable processor is a microprocessor, digital signal processor, media processor, multimedia processor, cryptographic processor, or programmable System-on-a-Chip(SOC).

37. The system of claim 24 wherein said source sequence of bits is formed in subwords of two or more of said bits and further comprising:
means for determining pass through stages in said Benes network; and
means for eliminating said pass through stages.

38. A system of performing an arbitrary permutation of a source sequence of bits in a programmable processor said source sequence of bits is packed into a plurality of source registers comprising:
means for dividing bits of a first of said source registers to be placed in a first destination register into a first group and bits of said first of said source registers to be placed in a second destination register into a second group with one said permutation instruction sequence;
means for dividing bits of a second of said source registers going to said first destination register into a first group and bits of a second of said source registers going to a second destination register into a second group with one said permutation instruction sequence;
means for placing bits of said first group of said first of said source registers and said bits of said first group of said second of said source registers into said first destination register;
means for placing bits of said second group of said first of said source registers and said second group of said second of said source registers into said second destination register;
means for defining a sequence of bits of said first destination register, as a first source sequence of bits and a sequence of bits of said second destination register as a second source sequence of bits;
means for defining an intermediate sequence of bits that each of said first source sequence of bits and said second source sequence of bits is transformed into using a Benes network; and
means for determining a permutation instruction for transforming said first source sequence of bits and said second source sequence of bits into one or more respective said intermediate sequence of bits until a respective desired sequence of bits is obtained for said first source sequence of bits and said second source sequence of bits,
wherein each intermediate sequence of bits is used as input to the subsequent permutation instruction and the determined permutation instructions form a permutation instruction sequence.

39. The system of claim 38 wherein at most 41gn+2 instructions are included in said permutation instruction sequence, wherein n is the number of subwords in said sequence of bits, each said subword comprising one or more bits.

40. A system of performing an arbitrary permutation of a source sequence of bits in a programmable processor comprising:
means for defining an intermediate sequence of bits that said source sequence of bits is transformed into with a configuration of a Benes network;
means for determining a permutation instruction for transforming said source sequence of bits into said intermediate sequence of bits;
means for storing said determined intermediate sequence of bits; and
means for determining a subsequent permutation instruction using said stored intermediate sequence of bits.

41. A system for performing a permutation of a source sequence of bits in a programmable processor comprising:
means for defining an intermediate sequence of bits that said source sequence of bits is transformed into using Benes network stages; and
means for determining a sequence of permutation operations for transforming said source sequence of bits into one or more intermediate sequence of bits until a desired sequence of bits is obtained.

42. The system of claim 41 wherein said intermediate sequence of bits is determined with a configuration of an Benes network, said Benes network comprising two butterfly networks of the same size connected back-to-back.

43. The system of claim 42 wherein at most 21gr/m said permutation instructions are included in said permutation instruction sequence, wherein r is the number of subwords in said sequence of bits, each said subword comprising one or more bits, and m is the number of network stages performed by one permutation instruction.

44. A computer implemented method for performing an arbitrary permutation of a sequence of bits comprising the steps of:
inputting said sequence of bits into a source register;
connecting said source register to an Benes network;
in response to an CROSS instruction selecting a configuration of said network; and
moving each of said bits in said source register to a position in a sequence of bits of a destination register based on configuration bits of a configuration register.

45. The method of claim 44 wherein at most 21gr/m said permutation instructions are included in said permutation instruction sequence, wherein r is the number of subwords in said sequence of subwords in said sequence of bits, each said subword comprising one or more bits, and m is the number of network stages performed by one permutation instruction.

46. A computer system for performing an arbitrary permutation comprising:
a source register;
a configuration register;
a destination register;
a Benes network coupled to said first source register, said configuration register and said destination register, in response to a CROSS instruction selecting a configuration of said Benes network, placing each bit in said sequence of bits from said source register to a position in a sequence of bits in said destination register based on a configuration of bits of said configuration register.

47. The system of claim 46 wherein at most 21gr/m said permutation instructions are included in said permutation instruction sequence, wherein r is the number of subwords in said sequence of subwords in said sequence of bits, each said subword comprising one or more bits, and m is the number of network stages performed by one permutation instruction.

48. The system of claim 47 wherein said intermediate sequence of bits is determined with a configuration of an Benes network, said Benes network comprising two butterfly networks of the same size connected back-to-back.

49. A computer readable medium having stored thereon data representing a sequence of permutation instructions, the sequence of permutation instructions which when executed by a processor, cause the processor to permutate a source sequence of subwords into one or more intermediate sequences of subwords using a Benes network, each intermediate sequence of subwords using input from said source sequence of subwords or a previous said intermediate sequence of subwords until a desired sequence of subwords is obtained, wherein each subword is one or more bits.

50. The computer readable medium of claim 49 wherein at most 21gr/m said permutation instructions are included in said permutation instruction sequence, wherein r is the number of subwords in said sequence of subwords in said sequence of bits, each said subword comprising one or more bits, and m is the number of network stages performed by one permutation instruction.

51. The system of claim 50 wherein said intermediate sequence of bits is determined with a configuration of an Benes network, said Benes network comprising two butterfly networks of the same size connected back-to-back.

52. A cryptographic system, having stored thereon data representing a sequence of permutation instructions, the sequence of permutation instructions which when executed by a processor, cause the processor to permutate a source sequence of subwords into one or more intermediate sequences of subwords using a Benes network, each intermediate sequence of subwords using input from said source sequence of subwords or a previous said intermediate sequence of subwords until a desired sequence of subwords is obtained, wherein each subword is one or more bits.

53. The cryptographic system of claim 52 wherein at most 21gr/m said permutation instructions are included in said permutation instruction sequence, wherein r is the number of subwords in said sequence of subwords in said sequence of bits, each said subword comprising one or more bits, and m is the number of network stages performed by one permutation instruction.

54. The system of claim 52 wherein said intermediate sequence of bits is determined with a configuration of an Benes network, said Benes network comprising two butterfly networks of the same size connected back-to-back.

55. A method of performing an arbitrary permutation of a source sequence of bits in a programmable processor comprising the steps of:
   a. defining an intermediate sequence of bits that said source sequence of bits is transformed into with a configuration of a Benes network, said Benes network comprising at least two stages;
   b. determining a permutation instruction for transforming said source sequence of bits into said intermediate sequence of bits;
   c. storing said determined intermediate sequence of bits; and
   d. determining a subsequent permutation instruction using said stored intermediate sequence of bits.

56. The method of claim 55 further comprising repeating step c. and step d. until a desired sequence of bits is obtained,
   wherein the determined permutation instructions form a permutation instruction sequence.

57. The method of claim 56 wherein configuration bits are used in said permutation instruction for determining movement of said source sequence of bits in said source register to said intermediate sequence of bits or movement of said intermediate sequence of bits into a destination register or a second intermediate sequence of bits and two configuration registers are used for storing said configuration bits.

58. A system of performing an arbitrary permutation of a source sequence of bits in a programmable processor comprising:
   means for defining an intermediate sequence of bits that said source sequence of bits is transformed into using Benes network stages;
   means for determining a permutation instruction for transforming said source sequence of bits into one or more intermediate sequence of bits until a desired sequence of bits is obtained, wherein each intermediate sequence of bits is used as input to a subsequent permutation instruction and the determined permutation instructions form a permutation instruction sequence; and
   means for reversing an order of each of said stages in said Benes network.

59. A system for performing an arbitrary permutation of a source sequence of bits in a programmable processor comprising:
   a. means for defining an intermediate sequence of bits that said source sequence of bits is transformed into with a configuration of a Benes network, said Benes network comprising at least two stages;
   b. means for determining a permutation instruction for transforming said source sequence of bits into said intermediate sequence of bits;
   c. means for storing said determined intermediate sequence of bits; and
   d. means for determining a subsequent permutation instruction using said stored intermediate sequence of bits.

60. The system of claim 59 further comprising means for repeating c. and d. until a desired sequence of bits is obtained,
   wherein the determined permutation instructions form a permutation instruction sequence.

61. The system of claim 60 wherein configuration bits are used in said permutation instruction for determining movement of said source sequence of bits in said source register to said intermediate sequence of bits or movement of said intermediate sequence of bits into a destination register or a second intermediate sequence of bits and two configuration registers are used for storing said configuration bits.

62. A method of performing an arbitrary permutation of a source sequence of bits in a programmable processor comprising the steps of:
   a. defining an intermediate sequence of bits that said source sequence of bits is transformed into;
   b. determining a permutation instruction for transforming said source sequence of bits into said intermediate sequence of bits;
   c. repeating steps a. and b. using said determined intermediate sequence of bits from step b. as said source sequence of bits in step a. until a desired sequence of bits is obtained, the determined permutation instructions form a permutation instruction sequence and configuration bits are used in said permutation instruction for determining movement of said source sequence of bits in a source register to said intermediate sequence of bits or movement of said intermediate sequence of bits into a destination register or a second intermediate sequence of bits;

d. storing said configuration bits; and e. retrieving said stored configuration bits.

63. A method of performing an arbitrary permutation of a source sequence of bits in a programmable processor comprising the steps of:

a. defining an intermediate sequence of bits that said source sequence of bits is transformed into;

b. determining a permutation instruction for transforming said source sequence of bits into said intermediate sequence of bits;

c. repeating steps a. and b. using said determined intermediate sequence of bits from step b. as said source sequence of bits in step a. until a desired sequence of bits is obtained, the determined permutation instructions form a permutation instruction sequence and configuration bits are used in said permutation instruction for determining movement of said source sequence of bits in a source register to said intermediate sequence of bits or movement of said intermediate sequence of bits into a destination register or a second intermediate sequence of bits;

d. storing a portion of said configuration bits; and e. retrieving said stored configuration bits.

64. A system of performing an arbitrary permutation of a source sequence of bits in a programmable processor comprising:

means for defining an intermediate sequence of bits that said source sequence of bits is transformed into using omega network stages and flip network stages;

means for determining a permutation instruction for transforming said source sequence of bits into one or more intermediate sequence of bits until a desired sequence of bits is obtained, wherein each intermediate sequence of bits is used as input to the subsequent permutation instruction and the determined permutation instructions form a permutation instruction sequence and configuration bits are used in said permutation instruction for determining movement of said source sequence of bits in said source register to said intermediate sequence of bits or movement of said intermediate sequence of bits into a destination register or a source register; and means for storing said configuration bits and means for retrieving said stored configuration bits for use in said permutation instruction.

65. A system of performing an arbitrary permutation of a source sequence of bits in a programmable processor comprising:

means for defining an intermediate sequence of bits that said source sequence of bits is transformed into using Benes network stages and flip network stages;

means for determining a permutation instruction for transforming said source sequence of bits into one or more intermediate sequence of bits until a desired sequence of bits is obtained, wherein each intermediate sequence of bits is used as input to the subsequent permutation instruction and the determined permutation instructions form a permutation instruction sequence and configuration bits are used in said permutation instruction for determining movement of said source sequence of bits in said source register to said intermediate sequence of bits or movement of said intermediate sequence of bits into a destination register or a source register; and means for storing said configuration bits and means for retrieving said stored configuration bits for use in said permutation instruction.

* * * * *